US010977576B2

(12) United States Patent
Namie et al.

(10) Patent No.: US 10,977,576 B2
(45) Date of Patent: Apr. 13, 2021

(54) CONTROL DEVICE, RECORDING MEDIUM, AND CONTROL SYSTEM

(71) Applicant: OMRON Corporation, Kyoto (JP)

(72) Inventors: Masaki Namie, Takatsuki (JP); Takashi Fujii, Kyoto (JP); Akiro Kobayashi, Kusatsu (JP)

(73) Assignee: OMRON Corporation, Kyoto (JP)

( * ) Notice: Subject to any disclaimer, the term of this patent is extended or adjusted under 35 U.S.C. 154(b) by 607 days.

(21) Appl. No.: 15/893,704

(22) Filed: Feb. 12, 2018

(65) Prior Publication Data
US 2018/0374001 A1    Dec. 27, 2018

(30) Foreign Application Priority Data
Jun. 21, 2017  (JP) .............................. JP2017-121562

(51) Int. Cl.
*G06N 20/00* (2019.01)
*G05B 13/04* (2006.01)
*G05B 15/02* (2006.01)

(52) U.S. Cl.
CPC ........... *G06N 20/00* (2019.01); *G05B 13/041* (2013.01); *G05B 13/048* (2013.01); *G05B 15/02* (2013.01);
(Continued)

(58) Field of Classification Search
CPC ........ G05B 13/00; G05B 13/02; G05B 13/04; G05B 13/041; G05B 13/048; G05B 15/00;
(Continued)

(56) References Cited

U.S. PATENT DOCUMENTS

| 2004/0135534 A1* | 7/2004 | Cullen | G05B 17/02 |
| | | | 318/609 |
| 2004/0150363 A1* | 8/2004 | Toyozawa | G05B 19/404 |
| | | | 318/568.13 |
| 2017/0111000 A1* | 4/2017 | Saito | H02P 27/06 |

FOREIGN PATENT DOCUMENTS

| CN | 1519673 | 8/2004 |
| CN | 101893872 | 11/2010 |

(Continued)

OTHER PUBLICATIONS

"Search Report of European Counterpart Application," dated Oct. 11, 2018, pp. 1-17.

(Continued)

*Primary Examiner* — Geepy Pe
*Assistant Examiner* — Michael Allen Brace, Jr.
(74) *Attorney, Agent, or Firm* — JCIPRNET

(57) ABSTRACT

A control device generates a second command value by compensating a first command value output at every control cycle according to a predetermined pattern with a correction amount output at every control cycle according to correction data, updates the correction data based on a deviation between the first command value and a feedback value from the control object, and determines an initial value of the correction data. The control device acquires a response characteristic indicating a relationship between an assigned command value and a feedback value shown in the control object in response to the command value, estimates a feedback value to be shown in the control object based on a value obtained by compensating the first command value with temporary correction data and the response characteristic, and updates the temporary correction data based on a deviation between the first command value and the estimated feedback value.

20 Claims, 13 Drawing Sheets

(52) U.S. Cl.
CPC .............. *G05B 2219/41374* (2013.01); *G05B 2219/42058* (2013.01)

(58) Field of Classification Search
CPC ........ G05B 15/02; G05B 19/00; G05B 19/02; G05B 19/18; G05B 19/4155; G05B 2219/00; G05B 2219/30; G05B 2219/41; G05B 2219/41374; G05B 2219/42058; G06N 20/00
See application file for complete search history.

(56) References Cited

FOREIGN PATENT DOCUMENTS

| | | |
|---|---|---|
| CN | 102374038 | 3/2012 |
| CN | 102785046 | 11/2012 |
| CN | 105359406 | 2/2016 |
| CN | 105404848 | 3/2016 |
| CN | 106054816 | 10/2016 |
| CN | 106068480 | 11/2016 |
| CN | 106406134 | 2/2017 |
| CN | 106612088 | 5/2017 |
| CN | 106873506 | 6/2017 |
| EP | 1441270 | 7/2004 |
| JP | 2004227163 | 8/2004 |
| JP | 2008225533 | 9/2008 |
| JP | 2011186668 | 9/2011 |
| JP | 2017102624 | 6/2017 |

OTHER PUBLICATIONS

Norrlöf; Mikael, "Iterative Learning Control—Analysis, Design, and Experiments," Linköping Studies in Science and Technology. Dissertations, No. 653, Nov. 2000, pp. 1-265.

Abbeel; Pieter et al, "Using inaccurate models in reinforcement learning," Proceedings of the 23rd international conference on Machine learning, Jun. 25, 2006, pp. 1-8.

Farchy; Alon et al,"Humanoid Robots Learning to Walk Faster: From the Real World to Simulation and Back," Proceedings of the 12th International Conference on Autonomous Agents and Multiagent Systems, May 6, 2013, pp. 1-8.

Hanna; Josiah P. et al, "Grounded Action Transformation for Robot Learning in Simulation," Proceedings of the Thirty-First AAAI Conference on Artificial Intelligence (AAAI-17), Feb. 4, 2017, pp. 3834-3840.

Anonymous, "EE392m—Winter 2003 Control Engineering 8-1 Lecture 8—Model Identification," Stanford University, Dec. 1, 2003, pp. 1-21.

"Office Action of China Counterpart Application", dated Nov. 19, 2020, with English translation thereof, p. 1-p. 19.

"Office Action of Japan Counterpart Application" with English translation thereof, dated Feb. 2, 2020, p. 1-p. 6.

\* cited by examiner

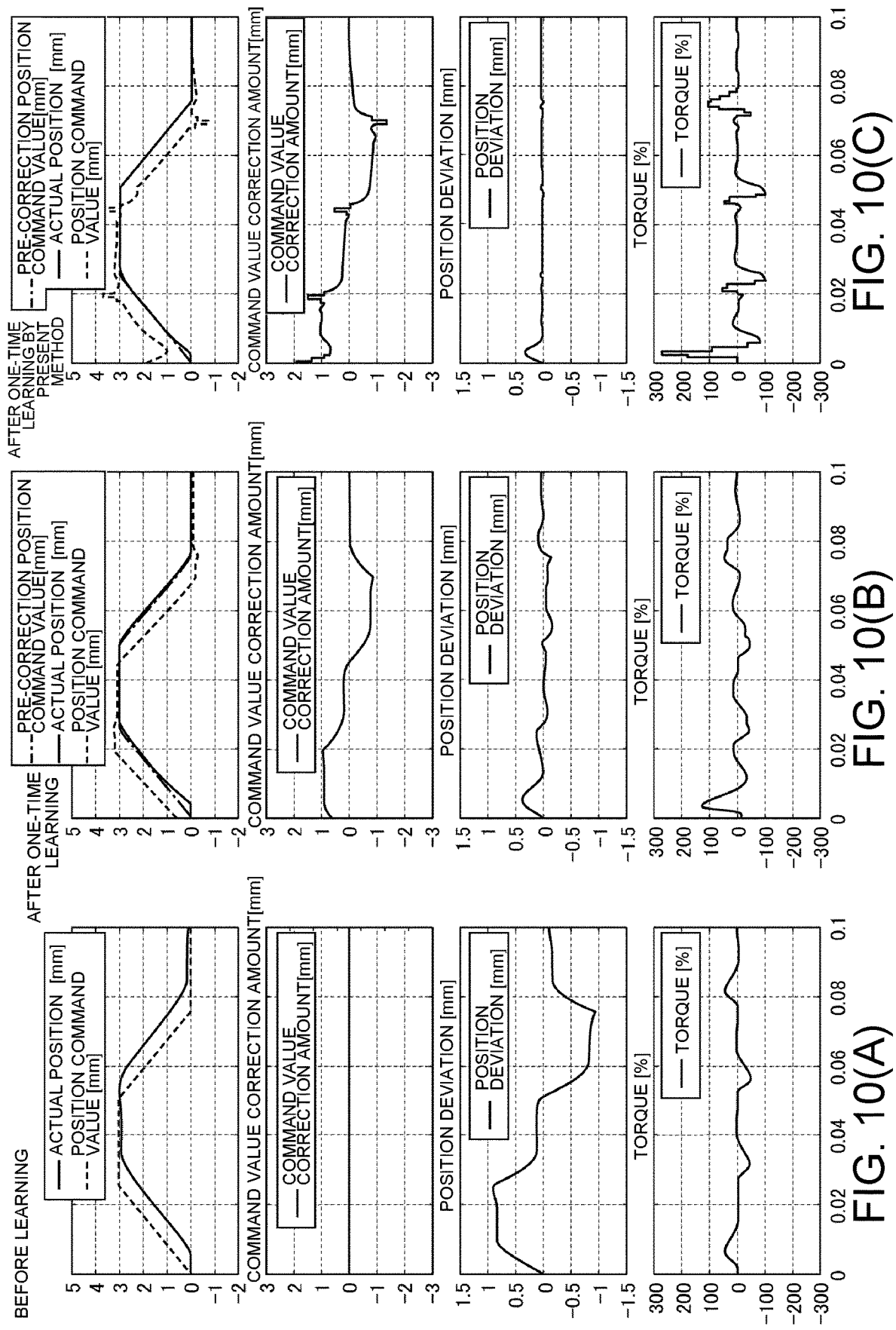

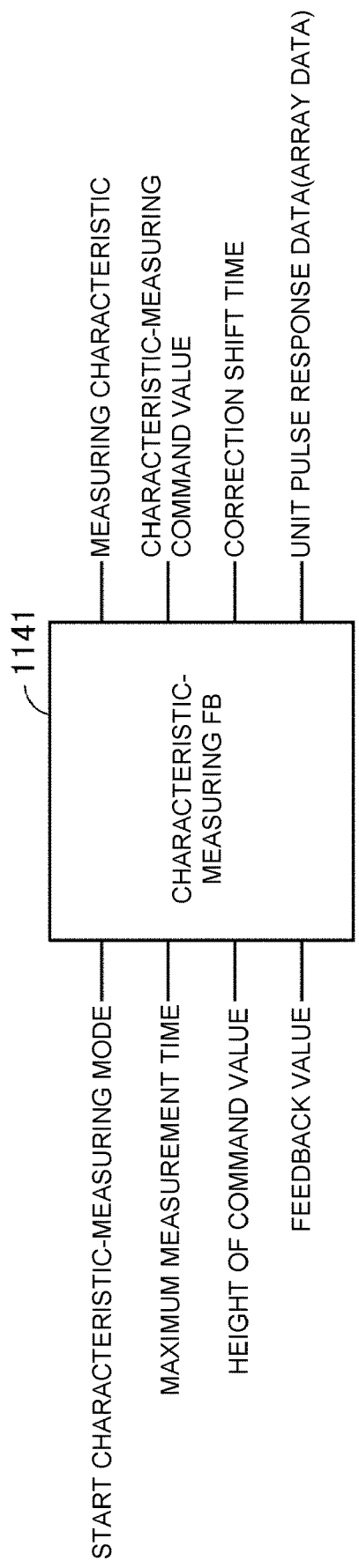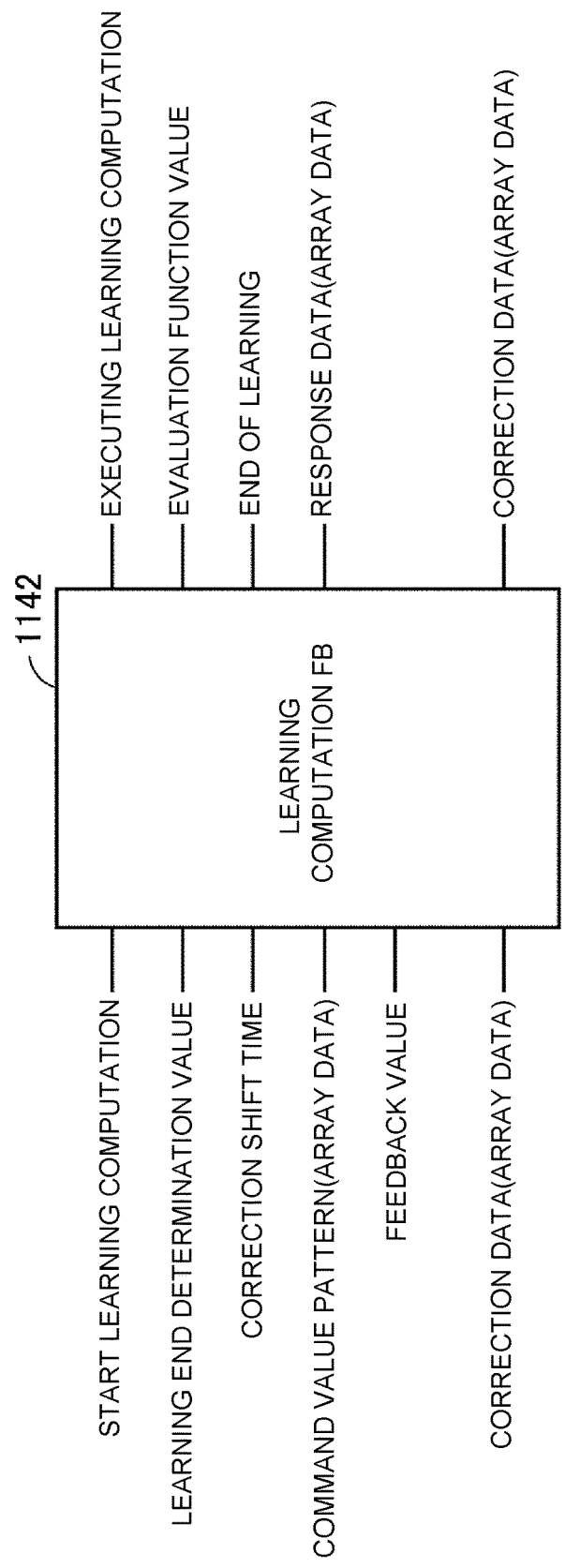
FIG. 12(A)
FIG. 12(B)

CONTROL DEVICE, RECORDING MEDIUM, AND CONTROL SYSTEM

CROSS-REFERENCE TO RELATED APPLICATION

This application claims the priority benefit of Japanese application serial no. 2017-121562, filed on Jun. 21, 2017. The entirety of the above-mentioned patent application is hereby incorporated by reference herein and made a part of this specification.

BACKGROUND

Technical Field

The disclosure relates to a technique for enhancing control performance for a control object by learning control.

Description of Related Art

As an example of a method of controlling a control object, there is a control system in which a command value sequentially output to a control object according to a command value pattern is corrected according to a characteristic of the control object and then assigned to the control object. In such a control system, learning control in which a correction amount or the like for a command value is sequentially updated by learning is employed.

Such learning control is applied, for example, to a dynamic system including an unknown element in a control object such as a mechanical system or a robot using a motor in some cases.

For example, in Japanese Patent Application Laid-open No. 2004-227163 (Patent Document 1), a servo control device which enables application of learning control when processing of the same shape of a part or the like is executed several times is disclosed.

In learning control described above, a certain degree of learning is necessary to determine an appropriate correction amount, and a control object has to be actually operated over a predetermined number of times to apply the learning control to the actual control object.

Therefore, there is a demand for reducing the number of times a control object is actually operated and reducing the man-hours for adjustment of learning control.

SUMMARY

According to an embodiment of the invention, a control device for controlling a control object is provided. The control device includes a command value generation unit configured to generate a second command value obtained by compensating a first command value output at every control cycle according to a predetermined pattern with a correction amount output at every control cycle according to correction data and output the second command value to a control computation unit. The control computation unit calculates a control output for a control object according to the second command value. The control device includes a learning computation unit configured to update the correction data based on a deviation between the first command value and a feedback value from the control object, and an initial value determination unit configured to determine an initial value of the correction data used in a state in which the update of the correction data by the learning computation unit is not executed. The initial value determination unit includes a characteristic acquisition unit configured to acquire a response characteristic indicating a relationship between a command value assigned to the control computation unit and a feedback value shown in the control object in response to the command value, an estimation unit configured to estimate a feedback value to be shown in the control object based on a value obtained by compensating the first command value with temporary correction data and the response characteristic, and an update unit configured to update the temporary correction data based on a deviation between the first command value and the estimated feedback value.

According to another embodiment of the invention, a non-transitory recording medium storing a control program for realizing a control device for controlling a control object is provided. The control program executes, in a computer, a step of generating a second command value obtained by compensating a first command value output at every control cycle according to a predetermined pattern with a correction amount output at every control cycle according to correction data and outputting the second command value to a control computation unit. The control computation unit calculates a control output for a control object according to the second command value. The control program executes, in the computer, a step of updating the correction data based on a deviation between the first command value and a feedback value from the control object, and a step of determining an initial value of the correction data used in a state in which update of the correction data is not executed. The step of determining the initial value of the correction data may include acquiring a response characteristic indicating a relationship between a command value assigned to the control computation unit and a feedback value shown in the control object in response to the command value, estimating a feedback value to be shown in the control object based on a value obtained by compensating the first command value with temporary correction data and the response characteristic, and updating the temporary correction data based on a deviation between the first command value and the estimated feedback value.

According to still another embodiment of the invention, a control system in which a control system for controlling a control object is provided includes a command value generation unit configured to generate a second command value obtained by compensating a first command value output at every control cycle according to a predetermined pattern with a correction amount output at every control cycle according to correction data, a control computation unit configured to calculate a control output for a control object according to the second command value, a learning computation unit configured to update the correction data based on a deviation between the first command value and a feedback value from the control object, and an initial value determination unit configured to determine an initial value of the correction data used in a state in which the update of the correction data by the learning computation unit is not executed. The initial value determination unit includes a characteristic acquisition unit configured to acquire a response characteristic indicating a relationship between a command value assigned to the control computation unit and a feedback value shown in the control object in response to the command value, an estimation unit configured to estimate a feedback value to be shown in the control object based on a value obtained by compensating the first command value with temporary correction data and the response characteristic, and an update unit configured to update the temporary correction data based on a deviation between the first command value and the estimated feedback value.

BRIEF DESCRIPTION OF THE DRAWINGS

FIG. 10(A) to FIG. 10(C) are graphs for describing an effect of the simulation learning computation according to the present embodiment.

FIG. 12(A) and FIG. 12(B) are views illustrating an implementation example of a learning control program (114) included in a control program of the control device according to the present embodiment.

DESCRIPTION OF THE EMBODIMENTS

Figure 1:
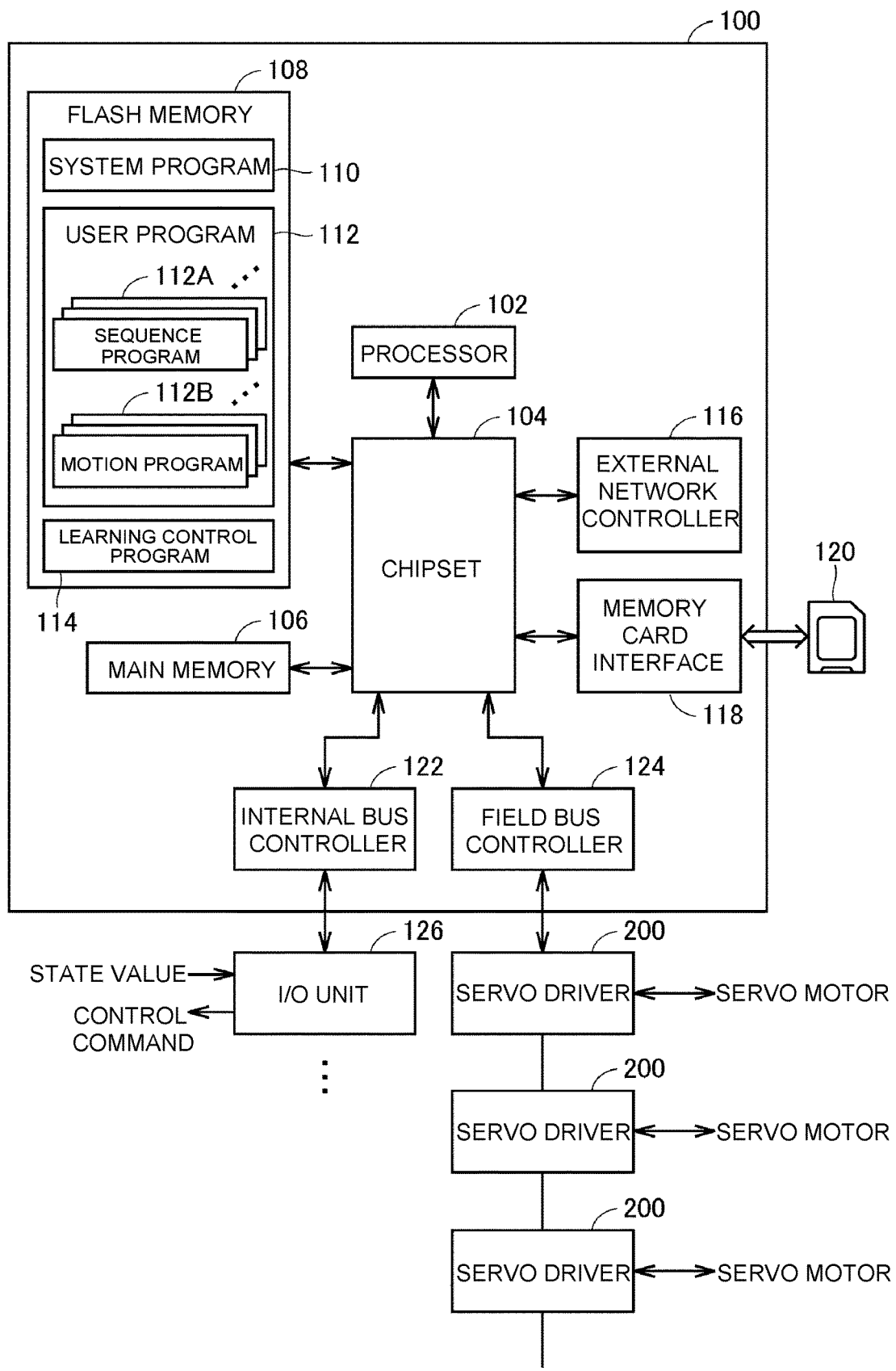
FIG. 1 is a schematic diagram illustrating a configuration of a control device according to the present embodiment.

In one or some exemplary embodiments, the initial value determination unit may further include a calculation unit configured to calculate a model error from a deviation between a feedback value shown in the control object in response to the output of the first command value to the control computation unit and an estimated feedback value corresponding thereto.

In one or some exemplary embodiments, the update unit may reflect the model error in post-update temporary correction data.

In one or some exemplary embodiments, the update unit may update the current temporary correction data with a value obtained by multiplying a deviation from the estimated feedback value by a predetermined coefficient.

In one or some exemplary embodiments, the characteristic acquisition unit may output a third command value output at every control cycle according to a step-like designated value pattern to the control computation unit and calculate a response characteristic for a unit pulse by temporal difference approximation for a temporal change in a feedback value acquired corresponding to the third command value.

In one or some exemplary embodiments, the characteristic acquisition unit may assign an arbitrary command value to the control computation unit and determine a transfer function estimated by a system identification method based on a temporal change in a feedback value acquired corresponding to the arbitrary command value as a response characteristic.

In one or some exemplary embodiments, the initial value determination unit may further include a unit configured to repeat processing of the estimation unit and the update unit until a predetermined end condition is satisfied.

According to an embodiment of the invention, the number of times a control object is actually operated can be reduced and the man-hours for adjustment of learning control can be reduced.

Embodiments of the invention will be described in detail with reference to the drawings. Like or corresponding parts in the drawings are denoted by like reference numerals, and descriptions thereof will not be repeated.

A. Configuration of Control Device

First, a configuration of a control device 100 according to the present embodiment is described. The control device 100 mainly has a function of controlling an arbitrary control object. The control device 100 may be, for example, a controller for factory automation (FA) such as a programmable logic controller (PLC) or a general purpose computer. A control system including learning control according to the present embodiment, which is described below, may be realized by a plurality of devices being associated with each other. For example, a PLC may be in charge of actual control including learning computation, and a general purpose computer associated with the PLC may be in charge of preliminary learning computation (simulation).

Learning control according to the present embodiment generates a command value by correcting a command value (hereinafter also referred to as "pre-correction command value") calculated every time from a predetermined command value pattern according to a characteristic of a control object. Then, control computation for calculating a control output based on the generated command value is executed. That is, the learning control according to the present embodiment mainly includes the command value generation, the learning computation, and the control computation.

Hereinafter, for convenience of description, a configuration example of a case in which the control device 100 is implemented using a PLC is mainly shown.

FIG. 1 is a schematic diagram illustrating a configuration of the control device 100 according to the present embodiment. Referring to FIG. 1, the control device 100 assigns a control output or command value calculated by executing a pre-stored control program (including a system program 110 and a user program 112) to a servo driver 200 and acquires a feedback value through the servo driver 200 or an input/output (I/O) unit 126. The control device 100 realizes learning control using the control output or command value and the feedback value.

More specifically, the control device 100 includes a processor 102 such as a central processing unit (CPU) or a micro-processing unit (MPU), a chip set 104, a main memory 106, a flash memory 108, an external network controller 116, a memory card interface 118, an internal bus controller 122, and a field bus controller 124.

The processor 102 executes arbitrary control for a control object by reading the system program 110 and the user program 112 stored in the flash memory 108 and developing and executing the read system program 110 and user program 112 in the main memory 106. The system program 110 includes instruction codes for providing basic functions of the control device 100 such as data I/O processing or execution timing control. The user program 112 is arbitrarily designed according to a control object and includes a sequence program 112A for executing sequence control and a motion program 112B for executing motion control.

To realize the learning control according to the present embodiment, a learning control program 114 is stored in the flash memory 108. The learning control program 114 may realize learning control, which is described below, by being executed in association with the sequence program 112A and the motion program 112B.

In this way, the control programs (the system program 110, the user program 112, and the learning control program 114) realize the control device for controlling a control object by being executed by the processor 102.

The chip set 104 realizes processing of the control device 100 as a whole by controlling each component.

The internal bus controller 122 is an interface configured to exchange data with various devices connected to the control device 100 through an internal bus. An example in which the I/O unit 126 is connected is shown as an example of such a device.

The field bus controller 124 is an interface configured to exchange data with various devices connected to the control device 100 through a field bus. An example in which the servo driver 200 is connected is shown as an example of such a device.

The internal bus controller 122 and the field bus controller 124 may assign an arbitrary command value to a connected device and acquire arbitrary data (including a measured value) managed by the device.

The external network controller 116 controls an exchange of data through various wired/wireless networks. The memory card interface 118 is configured such that a memory card 120 can be attached thereto and detached therefrom, data can be written to the memory card 120, and data can be read from the memory card 120.

Some or all of the functions provided by the control device 100 executing the control program may be implemented as a dedicated hard-wired circuit. For example, some or all of the functions provided by the control device 100 executing the control program may be implemented using, for example, an application specific integrated circuit (ASIC), a field-programmable gate array (FPGA), or the like, as the hard-wired circuit.

B. Example of Function Sharing of Control System

Figure 2A:
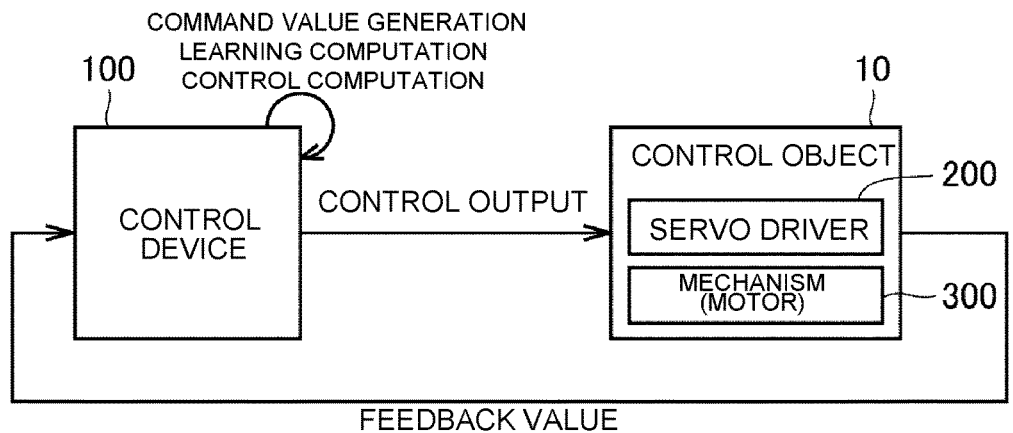
FIG. 2(A) to FIG. 2(C) are schematic diagrams illustrating an example of function sharing of a control system including the control device according to the present embodiment.
Figure 2B:
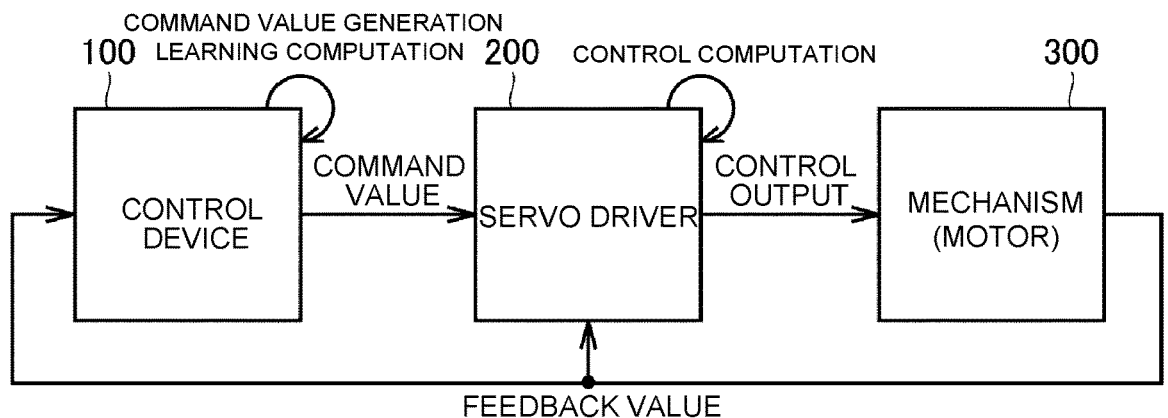
Figure 2C:
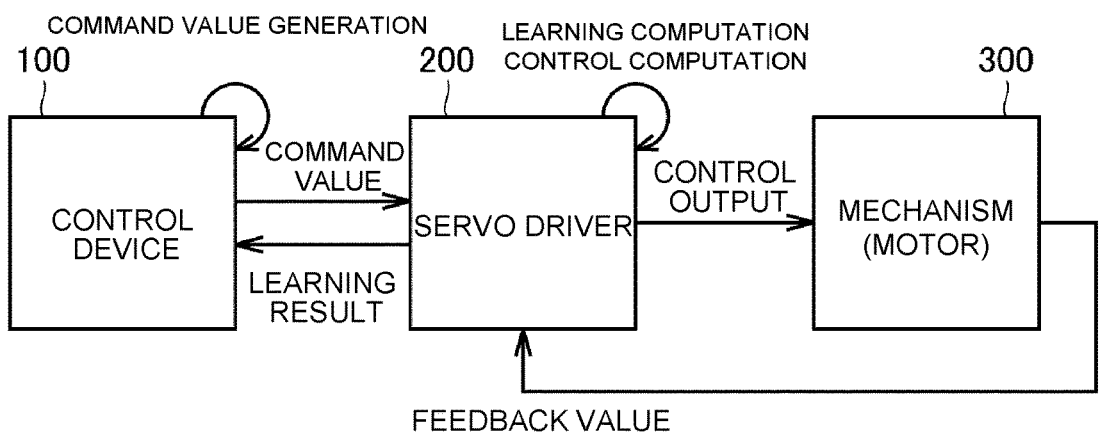

Next, an example of function sharing of the control system including the learning control according to the present embodiment is described. FIG. 2(A) to FIG. 2(C) are schematic diagrams illustrating an example of function sharing of a control system including the control device 100 according to the present embodiment. Referring to FIG. 2(A), typically, the control device 100 measures a feedback value from a control object 10 including the servo driver 200 and a mechanism 300 and outputs a control output obtained from a result of learning computation and control computation, in which the measured feedback value (control amount) is reflected, to the control object 10. That is, in the configuration illustrated in FIG. 2(A), the command value generation, the learning computation, and the control computation are executed in the control device 100. The control output illustrated in FIG. 2(A) corresponds to an operation amount.

In FIG. 2(A) to FIG. 2(C), the mechanism 300 is a generic term for a motor serving as a driving body and a mechanical body serving as a driven body.

As illustrated in FIG. 2(B), the control device 100 may assign a command value generated by executing command value generation and learning computation to the servo driver 200 and allow the servo driver 200 to execute control computation according to the command value.

Alternatively, as illustrated in FIG. 2(C), the control device 100 may execute command value generation to output a pre-correction command value to the servo driver 200 and allow the servo driver 200 to execute learning computation and control computation.

As illustrated in FIGS. 2(B) and 2(C), the control device 100 and the servo driver 200 may cooperate with each other to realize the learning control according to the present embodiment. Embodiments are not limited to the configurations illustrated in FIGS. 2(A) to 2(C), and the learning control may also be realized by an arbitrary hardware configuration.

As described above, one or a plurality of devices or units that realize the control system including the learning control according to the present embodiment may be collectively referred to as a "control system." The control system is a concept including an arbitrary configuration that consists of one or a plurality of devices or units.

C. Command Value Generation and Control Computation

Next, basic processing is described focusing on command value generation and control computation of the control system including the learning control according to the present embodiment.

Figure 3:
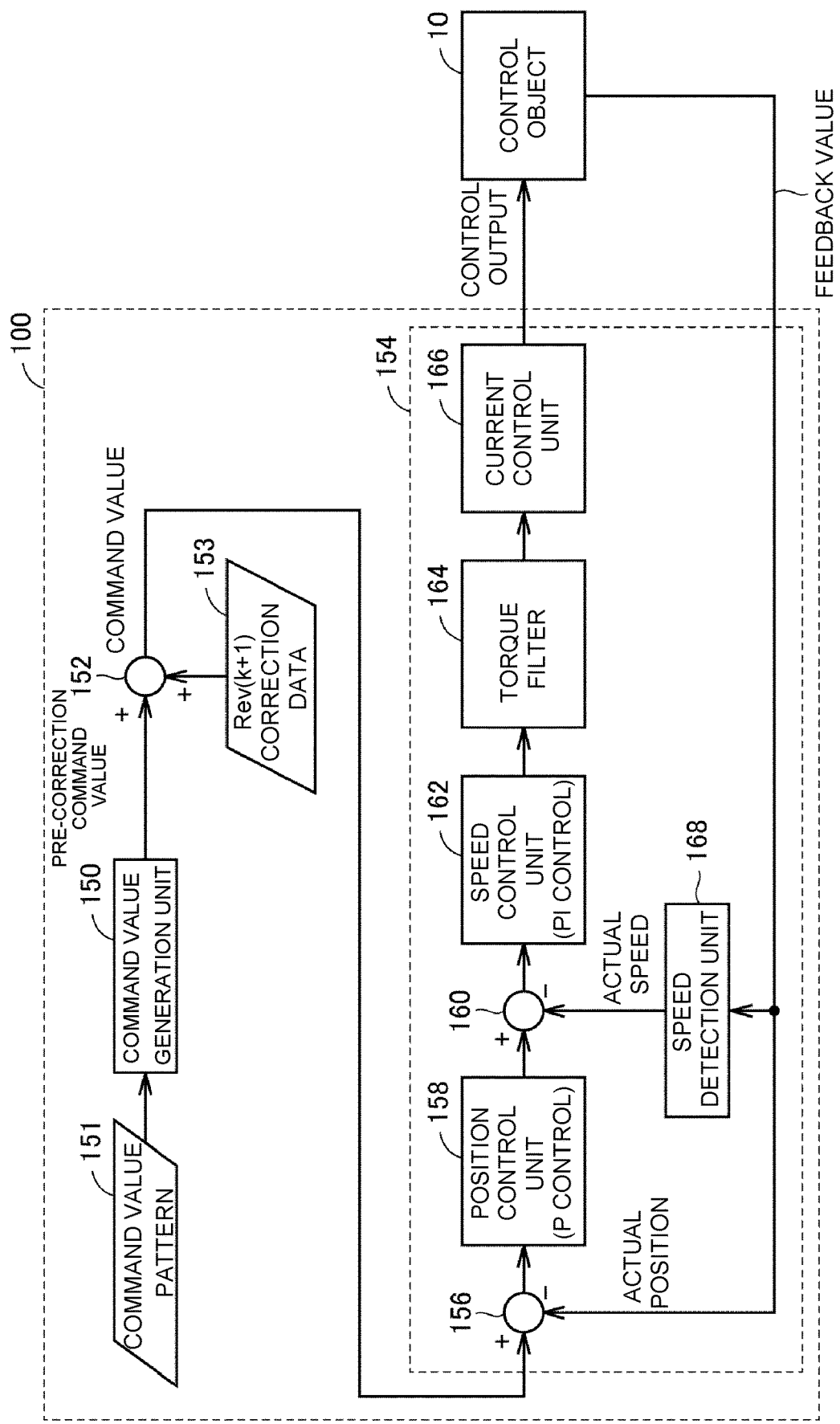
FIG. 3 is a schematic diagram focused on command value generation and control computation of a control system including learning control according to the present embodiment.

FIG. 3 is a schematic diagram focused on command value generation and control computation of the control system including the learning control according to the present embodiment. In FIG. 3, a configuration example of a case in which the control object 10 is controlled according to a predetermined position pattern is illustrated as an example. However, not limited to the position, any command value may be used.

Referring to FIG. 3, the control device 100 includes a command value generation unit 150 and a command value correction unit 152, which are in charge of command value generation. The control device 100 also includes a control computation unit 154, which is in charge of control computation.

The command value generation unit 150 outputs a pre-correction command value (corresponding to a "first command value") at every control cycle (for example, 1 ms) according to a predetermined command value pattern 151. In the example illustrated in FIG. 3, it is assumed that the command value pattern 151 defines a trajectory (position pattern) along which the control object 10 should move. Therefore, the pre-correction command value is a position command value.

The command value correction unit 152 compensates the pre-correction command value from the command value generation unit 150 with a correction amount output at every control cycle according to correction data 153 and generates a command value (post-correction command value: corresponding to a "second command value"). Then, the command value correction unit 152 outputs the generated command value to the control computation unit 154. In this example, the command value is a position command value. As will be described below, content of the correction data 153 is updated by the learning control.

Figure 4:
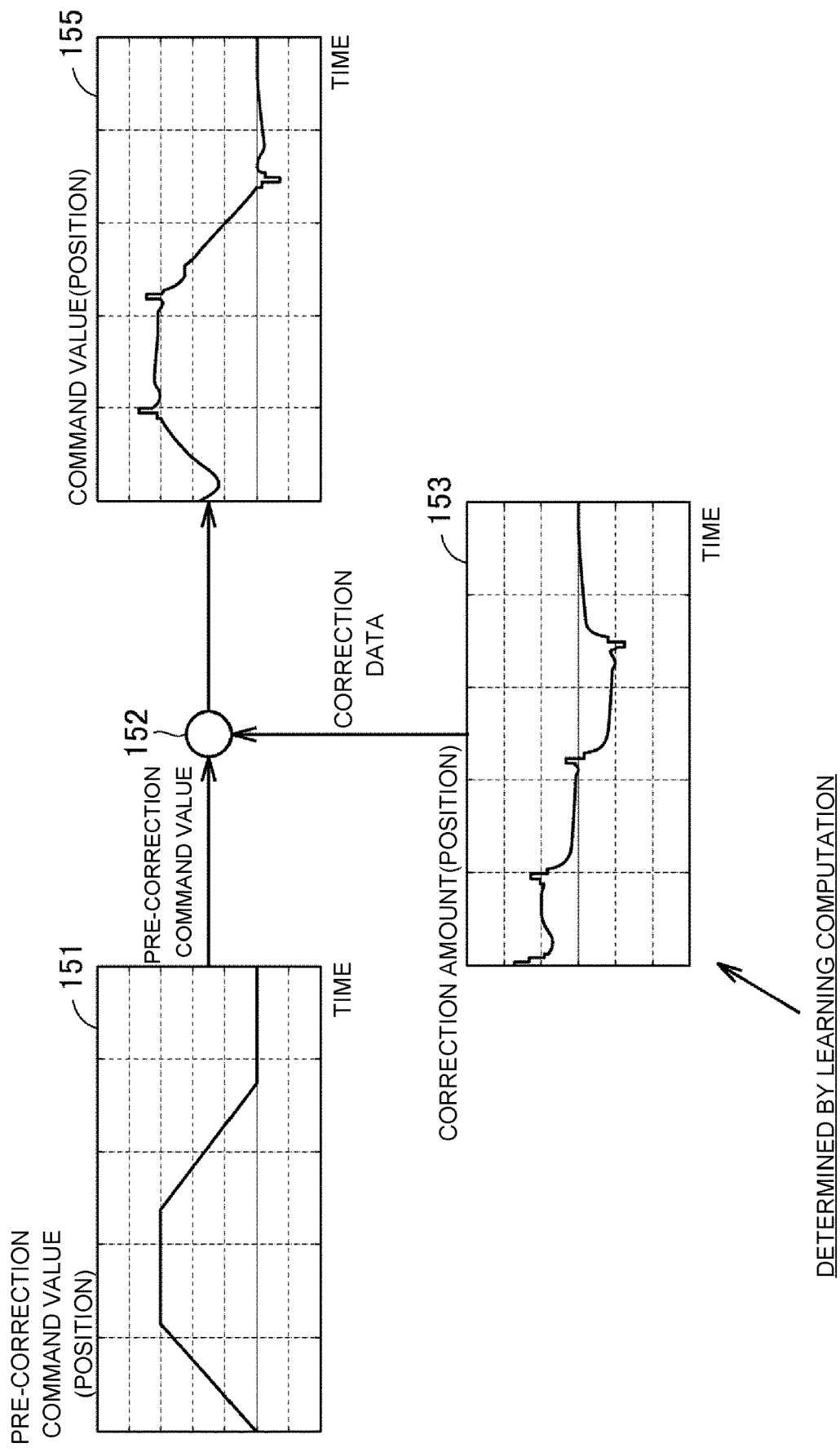
FIG. 4 is a view for describing an example of data related to the command value generation of the control system including the learning control according to the present embodiment.

FIG. 4 is a view for describing an example of data related to the command value generation of the control system including the learning control according to the present embodiment. Referring to FIG. 4, for example, it is assumed that the command value pattern 151 defines a pattern of starting from a reference point, moving in one direction, waiting at that position for a predetermined amount of time, and then returning to the original reference position. A pre-correction command value is output at every control cycle according to the command value pattern 151. By the pre-correction command value being output and made to correspond to a control cycle, a correction amount is sequentially output at every control cycle based on the correction data 153. In the command value correction unit 152, a command value 155 illustrated in FIG. 4 is output to the control computation unit 154 by the pre-correction command value being compensated with the correction amount.

For example, since the control object 10 has a predetermined inertia and the control computation unit 154 has a certain amount of delay time, even when the pre-correction command value such as that defined in the command value pattern 151 is assigned to the control object 10, the control object 10 does not move according to the command value pattern 151. Accordingly, a correction amount (or a compensation amount) is stored in the correction data 153 for the control object 10 to be operated along the trajectory defined in the command value pattern 151. By the command value 155, which is compensated with such a correction amount, being assigned to the control computation unit 154, the control object 10 behaves according to the command value pattern 151.

A correction amount according to a characteristic of the control object 10 is defined in the correction data 153, and in the present embodiment, appropriate correction data 153 is determined by learning computation, which is described below.

Referring again to FIG. 3, the command value from the command value correction unit 152 is assigned to the control computation unit 154. The control computation unit 154 calculates a control output for the control object 10 according to the command value. More specifically, the control computation unit 154 executes control computation so that a feedback value of the control object 10 matches the command value, and calculates the control output. The control computation is repeatedly executed at every predetermined control cycle (for example, 1 ms). Although the control computation unit 154 executes position control in the example illustrated in FIG. 3, the control computation unit 154 may also execute speed control or the like.

In the control system illustrated in FIG. 3, the control computation unit 154 calculates a final control output (in this example, a current command value to be assigned to the servo driver 200) for the position command value from the command value correction unit 152 by position control loop and speed control loop.

More specifically, the control computation unit 154 includes difference units 156 and 160, a position control unit 158, a speed control unit 162, a torque filter 164, a current control unit 166, and a speed detection unit 168.

The position control unit 158 is a control computation unit constituting the position control loop, and outputs a speed command value as an operation amount according to a position deviation from the difference unit 156. The difference unit 156 calculates a deviation (position deviation) between a feedback value (actual position) of the control object 10 and a position command value.

The speed control unit 162 is a control computation unit constituting the speed control loop, and outputs a torque command value according to a speed deviation from the difference unit 160. The difference unit 160 calculates a deviation (speed deviation) between a feedback value (actual speed) of the control object 10 and an operation amount (speed command value) from the position control unit 158.

The speed detection unit 168 calculates the actual speed of a motor from a feedback value (for example, the number of pulses proportional to the number of rotations of the motor) from an encoder or the like mounted in the motor. Typically, the speed detection unit 168 is realized using a differentiating element.

The torque filter 164 removes a high frequency component included in the torque command value from the speed control unit 162. The current control unit 166 calculates a current command value indicating a size or timing of a current that the servo driver 200 should assign to the motor, from the torque command value from the torque filter 164.

In the control system illustrated in FIG. 3, proportional (P) control is employed as the position control unit 158, and proportional-integral (PI) control is employed as the speed control unit 162. However, the position control unit 158 and the speed control unit 162 may be any control system.

The learning control according to the present embodiment mainly focuses on improving control performance based on correction processing of a command value in the command value correction unit 152, and content of the control computation in the control computation unit 154 is not particularly limited.

As illustrated in FIGS. 2(B) and 2(C) described above, when the control device 100 and the servo driver 200 cooperate to realize the learning control according to the present embodiment, a cycle at which a pre-correction command value is generated by the command value generation unit 150, a cycle at which a command value is output by the command value correction unit 152, and a cycle at which control computation is executed by the control computation unit 154 do not have to match each other as long as computation processing is executed at a cycle of each device.

D. Learning Computation

Next, basic processing is described focusing on learning computation of the control system including the learning control according to the present embodiment.

Figure 5:
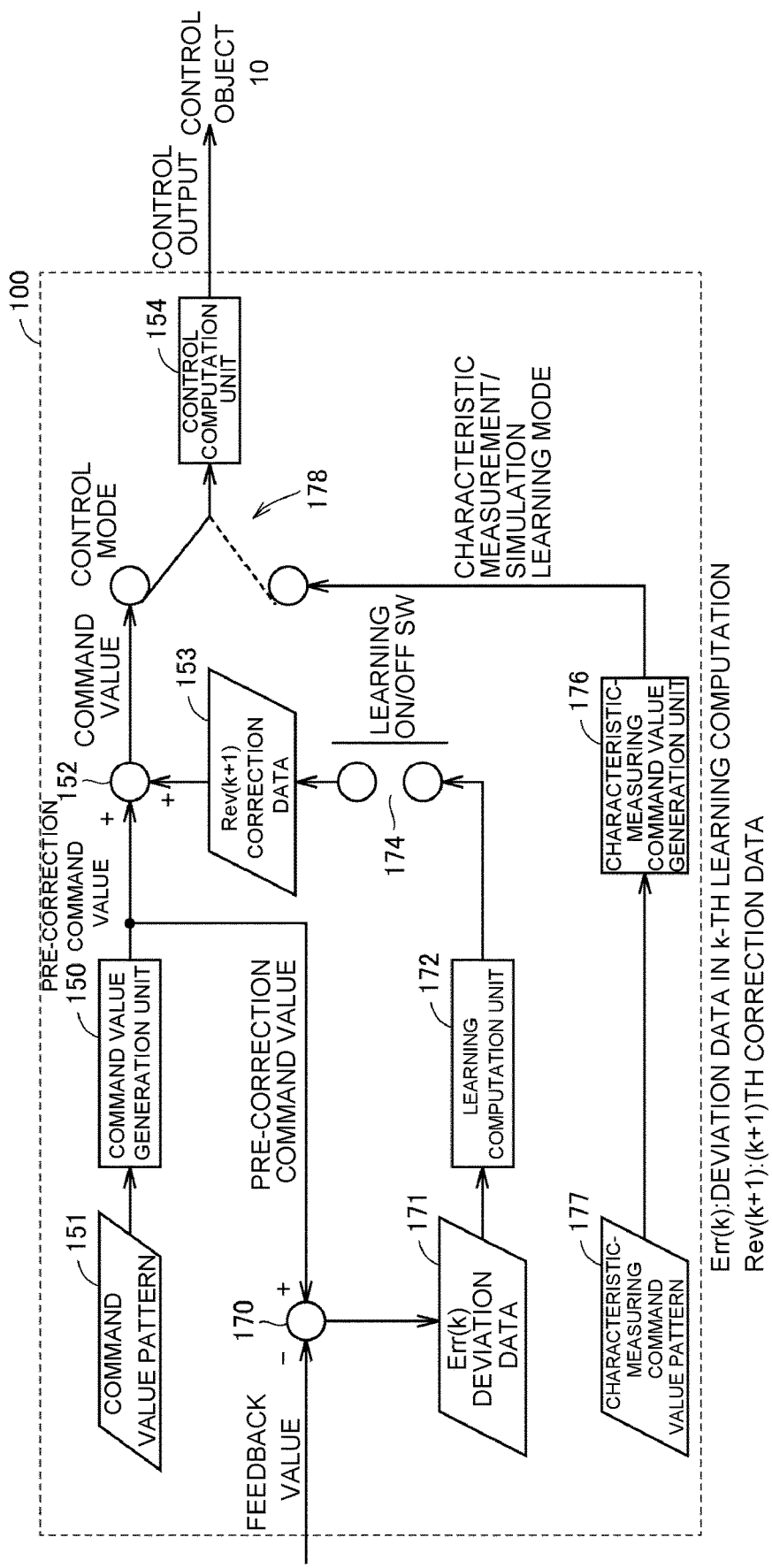
FIG. 5 is a schematic diagram focused on learning computation of the control system including the learning control according to the present embodiment.

FIG. 5 is a schematic diagram focused on the learning computation of the control system including the learning control according to the present embodiment. Referring to FIG. 5, the control device 100 includes a deviation calculation unit 170, a learning computation unit 172, and a learning switching unit 174, which are in charge of learning computation.

The learning computation of the learning control according to the present embodiment measures a change in a feedback value indicating a displacement that occurs in the control object 10 through the control computation unit 154 after a command value is output, and sequentially updates the correction data 153.

By the command value correction unit 152 outputting a command value to the control computation unit 154, the control computation unit 154 executes control computation according to an input characteristic-measuring command value and outputs the obtained control output to the control object 10. A change that occurred in the control object 10 is shown as a feedback value in response to the control output. The deviation calculation unit 170 calculates a deviation between a pre-correction command value from the command value generation unit 150 and the feedback value and sequentially outputs the calculated deviation as deviation data 171. The deviation data 171 refers to a difference between the predetermined command value pattern 151 and the actual behavior of the control object 10.

The learning computation unit 172 updates the correction data 153 based on the deviation data 171 (the deviation between the command value and the feedback value from the control object 10). By repeatedly outputting a series of pre-correction command values defined in the command value pattern 151 a plurality of times, the correction data 153 is sequentially updated, reflecting characteristics of the control computation unit 154 and the control object 10.

The total output of a pre-correction command value defined in the command value pattern 151 is counted as one time, and deviation data in k-th learning computation is denoted as Err(k). Also, (k+1)th correction data calculated using the deviation data Err(k) obtained by executing the learning computation k times is denoted as Rev(k+1).

The learning computation unit 172 updates the correction data 153 in each learning computation. More specifically, the (k+1)th correction data Rev(k+1) is calculated using the deviation data Err(k) in the k-th learning computation according to the following formula, where n=0 to N.

$$\mathrm{Rev}(k+1)(n) = \mathrm{Rev}(k)(n) + G \times \mathrm{Err}(k)(n+st)$$

where Rev(k+1)(n): correction data at sample time n of (k+1)th learning computation, Rev(k)(n): correction data at sample time n of k-th learning computation G: coefficient for determining intensity of learning ($0 < G \leq 1$: usually may be "1")

Err(k)(n+st): deviation data at sample time (n+st) of the k-th learning computation st: correction shift time (an integer multiple of a control cycle)

In the above formula, Err(k)(n+st) means that, the deviation data is shifted toward the past by the correction shift time st when reflecting deviation data in correction data. This is intended to compensate for waste time due to the control computation, a delay in response of the mechanism 300, a delay in communication, and the like. The correction shift time st may be determined in advance from the characteristics of the control computation unit 154 and the control object 10 using a method of measuring a characteristic, which is described below.

The learning computation by the learning computation unit 172 is validated or invalidated by the learning switching unit 174 internally connecting or interrupting the learning computation unit 172 and the correction data 153. Generally, the learning computation by the learning computation unit 172 is invalidated after being executed a predetermined number of times. This is to prevent the correction data 153 from being over-learned.

The learning computation of the learning control according to the present embodiment has a mode in which an overall characteristic including the control computation unit 154 and the control object 10 is measured. Because this mode is also used in simulation learning computation described below, hereinafter, this mode is also referred to as a "characteristic measurement/simulation learning mode." In contrast to the characteristic measurement/simulation learning mode, a mode in which a command value from the command value correction unit 152 is output to the control computation unit 154 is also referred to as a "control mode."

The control device 100 includes a characteristic-measuring command value generation unit 176 and a mode switching unit 178, which are in charge of characteristic measurement.

In the characteristic measurement, the mode switching unit 178 is switched to the characteristic measurement/simulation learning mode, and the characteristic-measuring command value generation unit 176 and the control computation unit 154 are internally connected. The characteristic-measuring command value generation unit 176 outputs a characteristic-measuring command value at every control cycle according to a predetermined characteristic-measuring command value pattern 177. A characteristic including the control computation unit 154 and the control object 10 is calculated from a feedback value generated in response to the output of the characteristic-measuring command value. The characteristic including the control computation unit 154 and the control object 10 may be taken into consideration when determining a correction shift time used when updating the correction data 153.

The control cycle at which the characteristic-measuring command value generation unit 176 outputs a characteristic-measuring command value is basically set to be the same as the control cycle at which the command value generation unit 150 outputs a pre-correction command value. In one or some exemplary embodiments, a temporal change (for example, a pulse-like temporal change, a step-like temporal change (step response), a ramp-like temporal change (ramp response), and the like) for measuring the characteristic including the control computation unit 154 and the control object 10 is used as a characteristic-measuring command value pattern defined in the characteristic-measuring command value pattern 177. The pulse-like temporal change refers to a response characteristic when a pulse with a short time width (for example, one control cycle or the like) is assigned.

By the above learning computation, the correction data 153 for calculating an appropriate command value according to a control object is determined.

The learning switching unit 174 and the mode switching unit 178 illustrated in FIG. 5 may not be a physical switch and, for example, may be a logical switch implemented using software.

E. Simulation Learning Computation

Processing for more appropriately determining Rev(1) which is an initial value of the correction data 153 (hereinafter also referred to as "simulation learning computation") is further implemented in the control system including the learning control according to the present embodiment. Correction data input as Rev(1) is also referred as "temporary correction data" below.

In the simulation learning computation, computation corresponding to the above-described learning computation is executed by simulation by using the feedback value measured in the characteristic measurement/simulation learning mode. Temporary correction data is calculated from a result obtained by executing the simulation. By employing such simulation learning computation, the number of times a control object is actually operated to collect appropriate correction data may be reduced.

Figure 6:
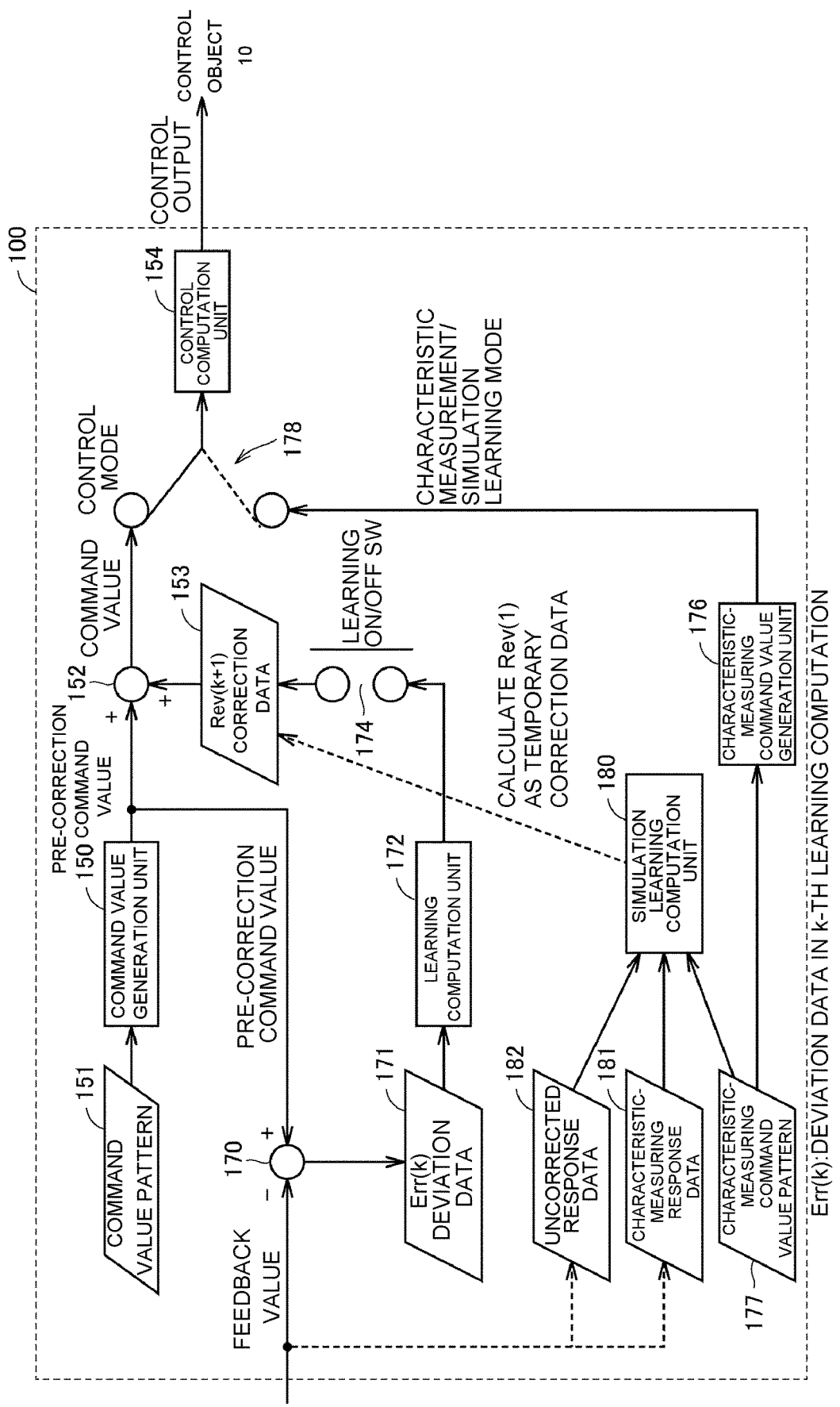
FIG. 6 is a schematic diagram of the control system including the learning control according to the present embodiment illustrated in FIG. 5, to which simulation learning computation is added.

FIG. 6 is a schematic diagram of the control system including the learning control according to the present embodiment illustrated in FIG. 5, to which simulation learning computation is added. Referring to FIG. 6, the control device 100 includes a simulation learning computation unit 180 which is in charge of simulation learning computation. The simulation learning computation also uses functions of the characteristic-measuring command value generation unit 176 and the mode switching unit 178.

In the simulation learning computation, basically, two pieces of response data (temporal changes of a feedback value) are measured.

The first piece of response data is uncorrected response data 182 corresponding to a temporal change of a feedback value generated when a pre-correction command value defined in the command value pattern 151 is output to the control computation unit 154 without change (without any correction amount assigned in the command value correction unit 152).

A second piece of response data is characteristic-measuring response data 181 corresponding to a temporal change of a feedback value generated when a pre-correction command value defined in the characteristic-measuring command value pattern 177 is output to the control computation unit 154.

The simulation learning computation unit 180 simulates an overall characteristic including the control computation unit 154 and the control object 10 based on the uncorrected response data 182, the characteristic-measuring command value pattern 177, and the characteristic-measuring response data 181 and calculates temporary correction data used as Rev(1). That is, the simulation learning computation unit 180 determines the initial value Rev(1) of the correction data 153 used in a state in which the update of the correction data 153 by the learning computation unit 172 is not executed.

As described below, the step-like temporal change (step response) is employed as the characteristic-measuring command value pattern 177.

F. Processing Procedure

Figure 7:
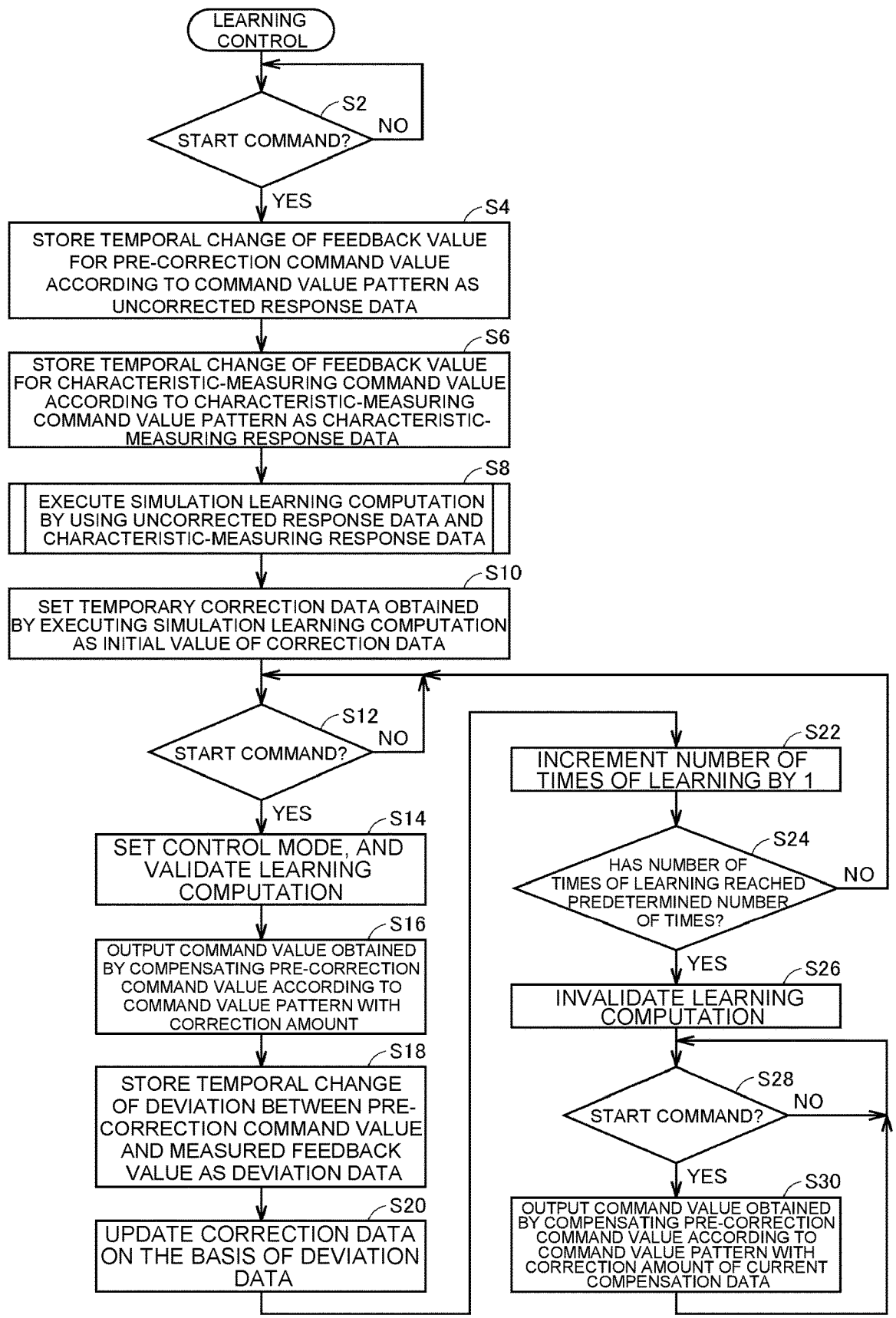
FIG. 7 is a flowchart illustrating a processing procedure related to learning control in the control device according to the present embodiment.

Next, a processing procedure related to the learning control in the control device 100 according to the present embodiment is described. FIG. 7 is a flowchart illustrating a processing procedure related to the learning control in the control device 100 according to the present embodiment. Each step illustrated in FIG. 7 is realized by the processor 102 illustrated in FIG. 1 executing the control programs (including the system program 110, the user program 112, and the learning control program 114).

Referring to FIG. 7, first, the control device 100 executes a preparation process (Steps S2 to S10) required for learning control.

Specifically, when the control device 100 receives a start command (YES in Step S2), the control device 100 sets a control mode (switches the mode switching unit 178 to the control mode side), assigns a pre-correction command value according to the command value pattern 151 to the control computation unit 154, and stores a temporal change of a feedback value measured at that time as the uncorrected response data 182 (Step S4).

Then, the control device 100 sets the characteristic measurement/simulation learning mode (switches the mode switching unit 178 to the characteristic measurement/simulation learning mode side), assigns a characteristic-measuring command value according to the characteristic-measuring command value pattern 177 to the control computation unit 154, and stores a temporal change of a feedback value measured at that time as the characteristic-measuring response data 181 (Step S6).

Then, the control device 100 uses the uncorrected response data 182 acquired in Step S2 and the characteristic-measuring response data 181 acquired in Step S6 to execute simulation learning computation (Step S8). The control device 100 sets temporary correction data obtained by executing the simulation learning computation in Step S8 as Rev(1), which is the initial value of the correction data 153 (Step S10). That is, the control device 100 determines the initial value Rev(1) of the correction data 153 used in the state in which the update of the correction data 153 is not executed.

Because the preparation process for the learning control is completed by the above process, subsequently, the learning control is started.

When the control device 100 receives a start command (YES in Step S12), the control device 100 sets the control mode (switches the mode switching unit 178 to the control mode side) and validates learning computation (sets the learning switching unit 174 to be turned on) (Step S14). Then, in response to the start command, the control device 100 outputs a command value obtained by compensating a pre-correction command value output at every control cycle according to the predetermined command value pattern 151 with a correction amount output at every control cycle according to the current correction data 153 (Step S16). A control output for the control object 10 is calculated according to the output command value.

Then, the control device 100 stores a temporal change of a deviation between the pre-correction command value from the command value generation unit 150 and a measured feedback value as the deviation data 171 (Step S18) and updates the correction data 153 based on the stored deviation data 171 (Step S20). That is, the control device 100 updates the correction data 153 based on the deviation between the command value and the feedback value from the control object 10.

When all outputs of temporal changes defined in the command value pattern 151 are completed, the control device 100 increments the number of times of learning by 1 (Step S22). Then, the control device 100 determines whether the number of times of learning has reached a predetermined number of times (Step S24), and if the number of times of learning has not reached the predetermined number of times (NO in Step S24), the control device 100 repeats the processes in and after Step S12.

In contrast, if the number of times of learning has reached the predetermined number of times (YES in Step S24), the control device 100 invalidates the learning computation (sets the learning switching unit 174 to be turned off) (Step S26). Hereinafter, the learning control is executed in a normal control mode.

When the control device 100 receives a start command (YES in Step S28), in response to the start command, the control device 100 assigns a command value, calculated by compensating a pre-correction command value according to the command value pattern 151 with a correction amount output according to the current correction data 153, to the control computation unit 154 (Step S30). Hereinafter, the processes of Steps S28 and S30 are repeated.

G. Processing Procedure of Simulation Learning Computation

Next, a more detailed processing procedure of the simulation learning computation (Step S8 of FIG. 7) is described.

Figure 8:
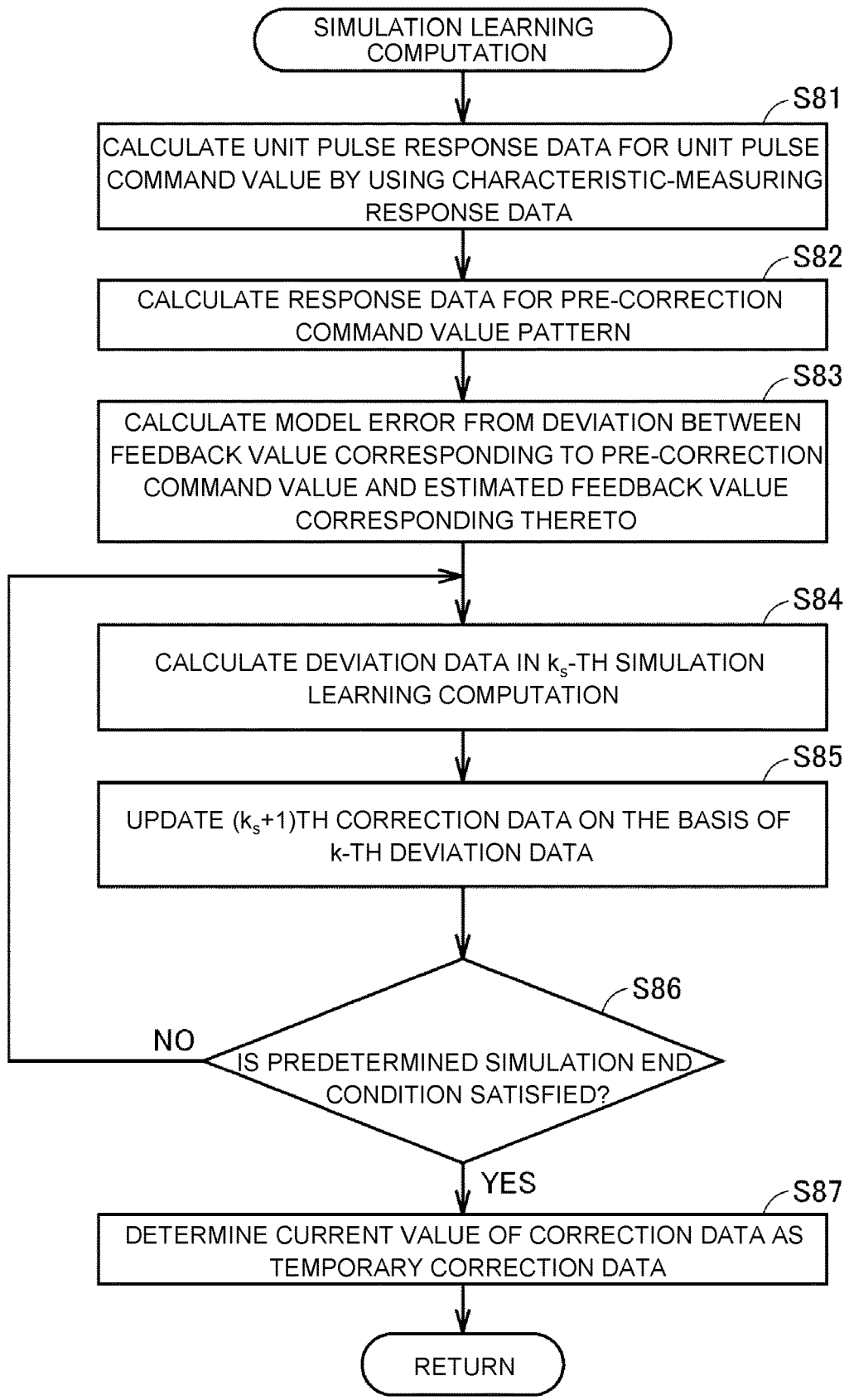
FIG. 8 is a flowchart illustrating a processing procedure related to simulation learning computation shown in Step S8 of FIG. 7.
Figure 9A:
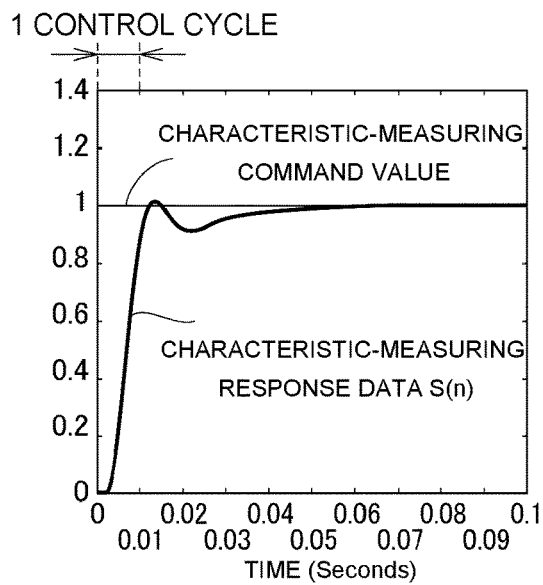
FIG. 9(A) to FIG. 9(C) are views illustrating an example of a time waveform acquired in the simulation learning computation shown in Step S8 of FIG. 7.
Figure 9B:
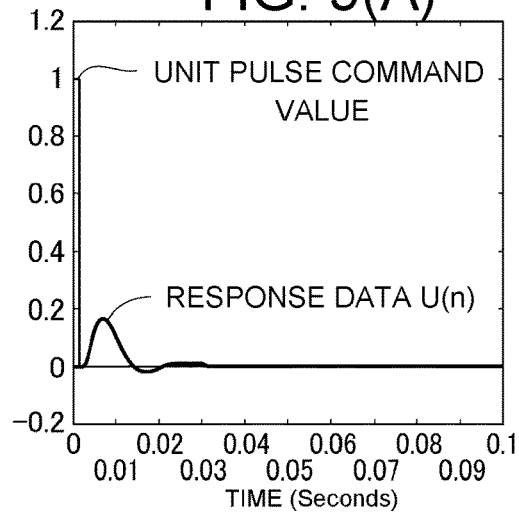
Figure 9C:
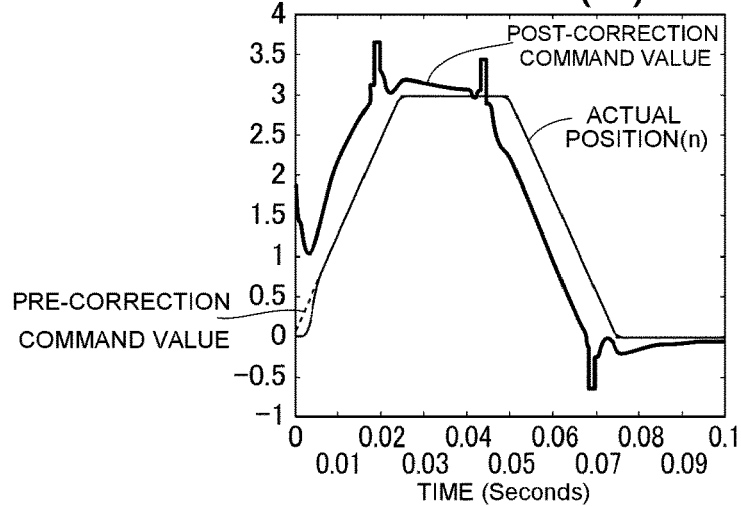

FIG. 8 is a flowchart illustrating a processing procedure related to the simulation learning computation shown in Step S8 of FIG. 7. FIG. 9(A) to FIG. 9(C) are views illustrating an example of a time waveform acquired in the simulation learning computation shown in Step S8 of FIG. 7.

Referring to FIG. 8, the control device 100 acquires a response characteristic indicating a relationship between the command value assigned to the control computation unit 154 and a feedback value shown in the control object 10 in response to the command value. More specifically, the control device 100 uses the characteristic-measuring response data 181 acquired in Step S6 to calculate unit pulse response data U(n) for a unit pulse command value (Step S81).

In the characteristic-measuring command value pattern 177, it is assumed that a step-like temporal change of height H is defined as a command value. The temporal change defined in the characteristic-measuring command value pattern 177 is defined over a length N times a control cycle.

In FIG. 9(A), with the control cycle set as 1 ms, a characteristic-measuring command value indicating a step-like temporal change of height 1 is assigned, and a time waveform of response data S(n) corresponding to characteristic-measuring response data shown at this time is shown. As illustrated in FIG. 9(A), when the characteristic-measuring command value is assigned, the response data S(n) gradually increases with a predetermined time constant.

The characteristic-measuring command value generation unit 176 outputs a characteristic-measuring command value at every control cycle according to the predetermined characteristic-measuring command value pattern 177. A temporal change of a feedback value generated for the characteristic-measuring command value, i.e., the response data S(n) (n=0 to N) at every control cycle, is stored as the characteristic-measuring response data 181.

The temporal change stored in the characteristic-measuring response data 181 corresponds to a discrete step response of the control computation unit 154 and the control object 10. In Step S81, a discrete unit impulse response is calculated from the discrete step response.

Specifically, with one control cycle as a unit time, the unit pulse response data U(n) (n=0 to N) with respect to the command value of a pulse having a unit time width of height 1 (hereinafter also referred to as "unit pulse") is approximately calculated according to the following formula. Here, S(-1)=0.

$$U(n)=\{S(n)-S(n-1)\}/H$$

In this way, the control device 100 outputs a characteristic-measuring command value output at every control cycle according to a step-like designated value pattern to the control computation unit 154 and calculates a response characteristic (that is, the unit pulse response data U(n)) for a unit pulse by temporal difference approximation for a temporal change (that is, the response data S(n)) of a feedback value acquired corresponding to the characteristic-measuring command value.

Then, the control device 100 determines an initial value of temporary correction data. More specifically, the control device 100 calculates response data $R_{sim}(0)(n)$ for a pre-correction command value pattern defined in the predetermined command value pattern 151 (Step S82). More specifically, the unit pulse response data U(n) is used for a command value pattern D(n) defined in the command value pattern 151, and corresponding response data $R_{sim}(0)(n)$ (n=0 to N) is approximately calculated according to the following formula. Here, i=0 to n, and $R_{sim}(k_s)(0)=0$.

$$R_{sim}(0)(n)=\Sigma\{D(i)\times U(n-i)\}$$

That is, by a type of convolution computation between the command value pattern D(n) and the unit pulse response data U(n), the response data $R_{sim}(0)(n)$, which corresponds to a response characteristic to be acquired before the start of the learning computation, is calculated.

In FIG. 9(B), a unit pulse command value calculated from the response data S(n) illustrated in FIG. 9(A) and a time waveform of the unit pulse response data U(n) corresponding to the unit pulse command value is illustrated. As illustrated in FIG. 9(B), the unit pulse response data U(n) shows a response only for a certain time in response to a unit pulse command.

Next, the control device 100 calculates a model error Merr(n) from a deviation between a feedback value shown in the control object 10 in response to the output of the pre-correction command value to the control computation unit 154 and an estimated feedback value corresponding thereto (Step S83). More specifically, the control device 100 calculates a deviation between the response data R(0)(n), which is a temporal change stored in the uncorrected response data 182 acquired in Step S4, and the response data $R_{sim}(0)(n)$ calculated in Step S82 as the model error Merr(n). That is, the model error Merr(n) (n=0 to N) is calculated according to the following formula.

$$\text{Merr}(n)=R(0)(n)-R_{sim}(0)(n)$$

Then, the control device 100 executes the learning computation by simulation (simulation learning computation). That is, the control device 100 realizes the same process as the update of the correction data 153 in the learning computation unit 172 described above by simulation.

First, the control device 100 estimates a feedback value which will be shown in the control object 10 based on a value obtained by compensating the pre-correction command value with the temporary correction data and the response characteristic.

More specifically, the control device 100 calculates deviation data $\text{Err}_{sim}(k_s)$ in $k_s$-th simulation learning computation (Step S84).

The deviation data $\text{Err}_{sim}(k_s)$ in the $k_s$-th simulation learning computation is approximately calculated according to the following formula in the simulation. Here, n=0 to N and i=0 to n.

$$R_{sim}(k_s)(n)=\Sigma[\{D(i)+\text{Rev}_{sim}(k_s)(i)\}\times U(n-i)]$$

$$\text{Err}_{sim}(k_s)(n)=D(n)-R_{sim}(k_s)(n)$$

Then, the control device 100 updates the temporary correction data based on the deviation between the command value and the estimated feedback value. More specifically, the control device 100 updates $(k_s+1)$th correction data $\text{Rev}_{sim}(k_s+1)$ based on the deviation data $\text{Err}_{sim}(k_s)$ (Step S85). The $(k_s+1)$th correction data $\text{Rev}_{sim}(k_s+1)$ is calculated according to the following formula. Here, n=0 to N.

$$\text{Rev}_{sim}(k_s+1)(n)=\text{Rev}_{sim}(k_s)(n)+G\times\text{Err}_{sim}(k_s)(n+st)+\text{Merr}(n),$$

where $\text{Rev}_{sim}(k_s+1)(n)$: correction data at sample time n of $(k_s+1)$th simulation learning, $\text{Rev}_{sim}(k_s)(n)$: correction data at sample time n of $k_s$-th simulation learning, G: coefficient for determining intensity of learning ($0<G\leq1$: usually may be "1"), $Err_{sim}(k_s)(n+st)$: deviation data at sample time (n+st) of the $k_s$-th simulation learning, st: correction shift time (an integer multiple of a control cycle).

As described above, the control device 100 updates the current temporary correction data with a value obtained by multiplying a deviation from the estimated feedback value by the predetermined coefficient G. Here, the model error Merr(n) may be reflected in post-update temporary correction data.

Then, when the execution of the simulation learning computation is completed, the control device 100 determines whether a predetermined simulation end condition is satisfied (Step S86). If the predetermined simulation end condition is not satisfied (NO in Step S86), the control device 100 executes processes in and after Step 84. In this way, the processes related to estimation of a feedback value and update of temporary correction data are repeated until the predetermined simulation end condition is satisfied.

If the predetermined simulation end condition is satisfied (YES in Step S86), the control device 100 determines a current value of the correction data $Rev_{sim}(k_s)$ as temporary correction data (Step S87). Then, the process proceeds to Step S10 of FIG. 7.

The predetermined simulation end condition includes, for example, convergence of an evaluation function including the sum of squares of the deviation data $Err_{sim}(k_s)$ to a sufficiently small value. Alternatively, the predetermined simulation end condition includes the execution of the simulation learning computation reaching the predetermined number of times of learning. In the simulation learning computation, because the possibility that the correction data 153 is excessively learned is low, the simulation end condition may be strictly set (that is, changed such that the number of times of learning is increased) in comparison to a condition for determining an end of the above-described learning computation.

By the above-described processing procedure, the temporary correction data used as Rev(1) is calculated.

In FIG. 9(C), an example of correction data obtained after executing the simulation learning computation ten times is illustrated. In FIG. 9(C), in addition to the correction data, an example of a temporal change of a pre-correction command value and the actual position (feedback value) is illustrated. As illustrated in FIG. 9(C), it can be recognized, by simulation, that appropriate correction data has been acquired in advance.

H. Embodiment

Next, a few embodiments according to the control system including the learning control according to the present embodiment are described.

FIGS. 10(A) to 10(C) and FIGS. 11(A) to 11(C) are graphs for describing effects of the simulation learning computation according to the present embodiment.

In FIG. 10(A), a time waveform of each unit when control is executed in a state in which the learning computation is not executed at all (a state in which no information is present in the correction data 153) is illustrated. In FIG. 10(B), a time waveform of each unit when control is executed in a state in which the learning computation is executed one time (a state in which only the information obtained by the one-time learning computation is present in the correction data 153) is illustrated. In FIG. 10(C), a time waveform of each unit when control is executed in a state in which temporary correction data is set by executing a predetermined number of times of simulation learning computation and then the learning computation is executed one time (a state in which, in the correction data 153, temporary correction data is updated by information obtained by the one-time learning computation) is illustrated.

In FIGS. 10(A) to 10(C), it can be assumed that more appropriate learning is executed as variation of a position deviation is lower. By one-time learning computation, the state illustrated in FIG. 10(A) is improved to the state illustrated in FIG. 10(B). However, when the simulation learning computation according to the present embodiment is executed in advance, it can be recognized that variation of a position deviation is lower as illustrated in FIG. 10(C) in comparison to variation of a position deviation illustrated in FIG. 10(B). That is, it can be recognized that the final correction data may be reached more quickly by executing the simulation learning computation in advance.

Figures 11A, 11B, 11C:
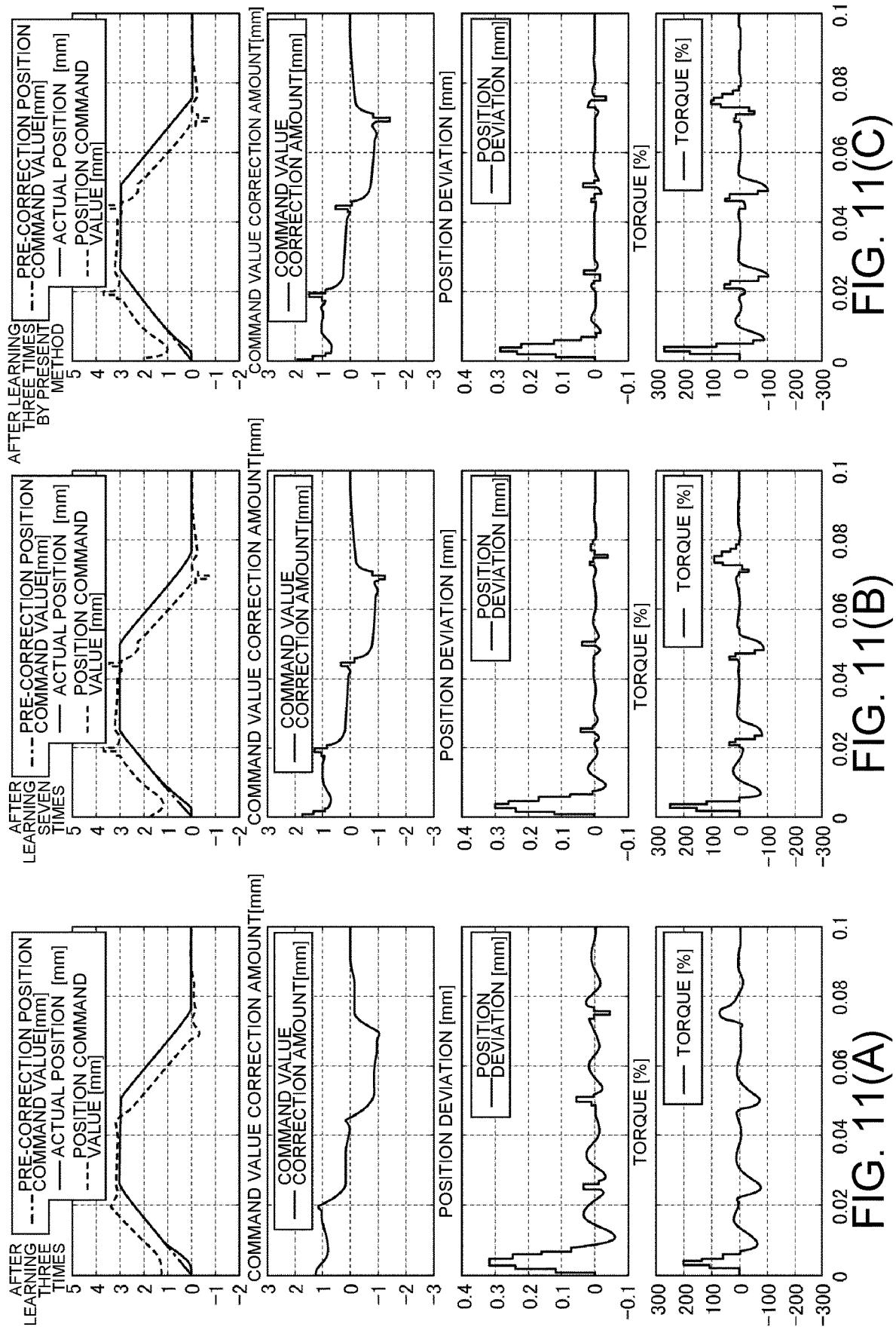
FIG. 11(A) to FIG. 11(C) are graphs for describing an effect of the simulation learning computation according to the present embodiment.

In FIG. 11(A), a time waveform of each unit when control is executed in a state in which the learning computation is executed three times (in a state in which information obtained by the three times of learning computation is present in the correction data 153) is illustrated. In FIG. 11(B), a time waveform of each unit when control is executed in a state in which the learning computation is executed seven times (information obtained by the seven times of learning computation is present in the correction data 153) is illustrated.

In FIG. 11(C), a time waveform of each unit when control is executed in a state in which temporary correction data is set by executing a predetermined number of times of simulation learning computation and then the learning computation is executed three times (a state in which, in the correction data 153, temporary correction data is updated by information obtained by the three times of learning computation).

As described above, it can be assumed that more appropriate learning is executed as variation of a position deviation is lower. By executing the learning computation four times, the state illustrated in FIG. 11(A) obtained by the three times of learning computation is improved to the state illustrated in FIG. 11(B) obtained by a total of seven times of learning computation. However, it can be recognized that, by executing the simulation learning computation according to the present embodiment in advance as illustrated in FIG. 11(C), the same effect as that of the seven times of learning computation illustrated in FIG. 11(B) may be obtained by only three times of learning computation. That is, in the example illustrated in FIGS. 11(A) to 11(C), it can be recognized that, by the simulation learning computation, the number of times the control object is actually operated can be reduced to half or less (from seven times to three times).

I. Implementation Example of Learning Control Program

Next, an implementation example of the learning control program 114 included in the control program pre-stored in the control device 100 according to the present embodiment is described.

Figure 13:
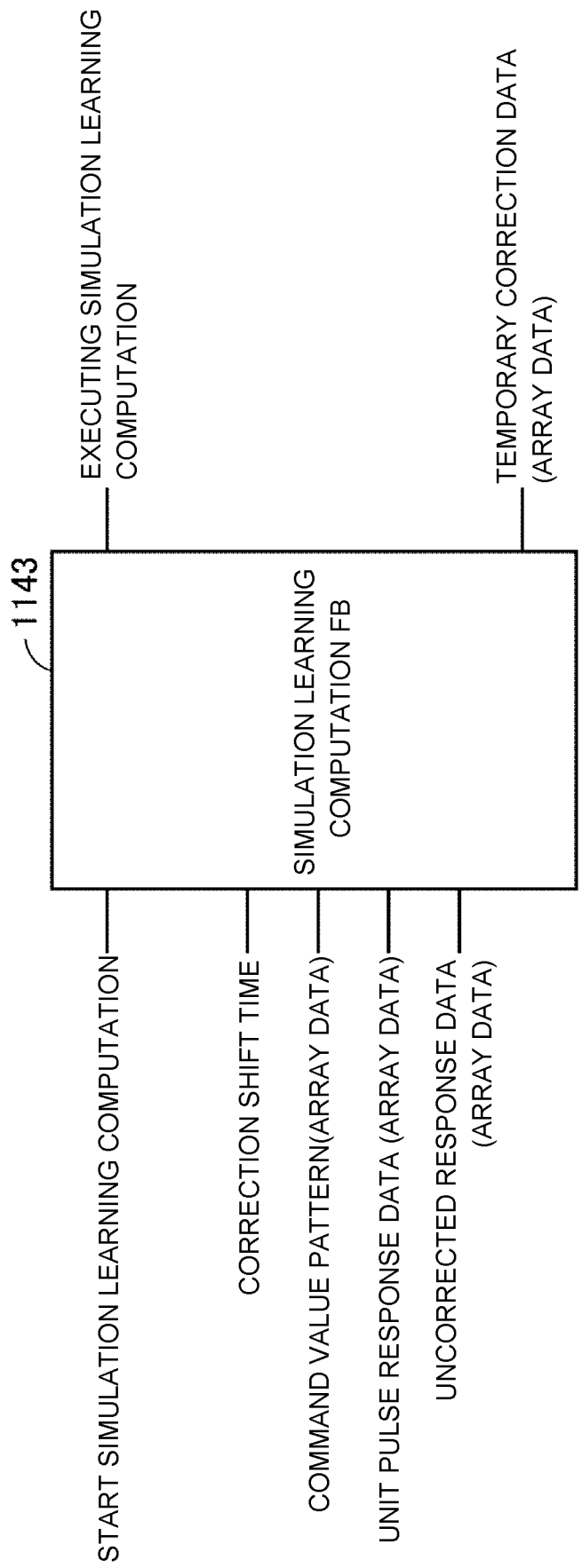
FIG. 13 is a view illustrating an implementation example of the learning control program (114) included in a control program of the control device according to the present embodiment.

FIGS. 12(A) and 12(B) and FIG. 13 are views illustrating implementation examples of the learning control program 114 included in the control program pre-stored in the control device 100 according to the present embodiment. FIGS. 12(A) and 12(B) and FIG. 13 illustrate examples in which execution of each of the processes described above is defined by a function block.

In FIG. 12(A), a characteristic-measuring function block 1141, which is in charge of measuring the overall characteristic including the control computation unit 154 and the control object 10, is illustrated. An element at the left of the characteristic-measuring function block 1141 illustrated in FIG. 12(A) is an input element, and an element at the right of the characteristic-measuring function block 1141 is an output element. The same applies for another functional block to be described below.

More specifically, in the characteristic-measuring function block 1141, start characteristic-measuring mode for instructing the start of the characteristic-measuring mode, a maximum measurement time for defining the time during which characteristic measurement should be continued, a height of a command value for defining a height of a step signal assigned as a characteristic-measuring command value, and a feedback value for defining a feedback value from the control object are input as input signals.

From the characteristic-measuring function block (FB) 1141, measuring characteristic indicating that the characteristic-measuring mode is being executed, a characteristic-measuring command value which is a monitor output of the characteristic-measuring command value, a correction shift time used for updating correction data in the learning computation, and the unit pulse response data U(n) used in the simulation learning computation are output. As the characteristic-measuring command value, a pulse-like or step-like command value is output over a designated maximum measurement time. Because the unit pulse response data is time-series data, the unit pulse response data may be output as array data.

In FIG. 12(B), a learning computation function block (FB) 1142 which is in charge of the learning computation is illustrated. The learning computation function block 1142 is assumed to be started at each learning computation.

More specifically, in the learning computation function block 1142, start learning computation for instructing the start of the learning computation, a learning end determination value which is a condition for ending the learning computation, a correction shift time used for updating correction data in the learning computation, a predetermined command value pattern, a feedback value for defining a feedback value from the control object, and the current correction data are input as input signals.

From the learning computation function block 1142, executing learning computation indicating that the learning computation is being executed, an evaluation function value indicating a result of one-time learning computation, an end of learning indicating that executing the learning computation is completed, a response data indicating a temporal change of a feedback value during the learning computation, and post-update correction data obtained as a result of the one-time learning computation are output. Because the response data and the correction data are time-series data, the response data and the correction data may be output as array data.

The response data acquired in the first learning computation may be used as the uncorrected response data 182 in the simulation learning computation. The correction data is updated for each learning computation.

In FIG. 13, a simulation learning computation function block (FB) 1143 which is in charge of the simulation learning computation is illustrated. The simulation learning computation is assumed as outputting temporary correction data with one start.

More specifically, in the simulation learning computation function block 1143, start simulation learning computation for instructing the start of the simulation learning computation, a correction shift time used for updating correction data in the simulation learning computation, a predetermined command value pattern, unit pulse response data, and uncorrected response data are input as input signals. Because the command value pattern, the unit pulse response data, and the uncorrected response data are time-series data, the command value pattern, the unit pulse response data, and the uncorrected response data may be output as array data.

From the simulation learning computation function block 1143, executing simulation learning computation indicating that the simulation learning computation is being executed, and temporary correction data determined by executing the simulation learning computation is output. Because the temporary correction data is time-series data, the temporary correction data may be output as array data. The temporary correction data may be used as an initial value of correction data input to the learning computation function block 1142. By employing a method, which will be described below, the uncorrected response data may be made unnecessary.

J. Modification of Embodiment

The above-described embodiment may be modified as below.

(1) Skip Characteristic Measurement in Simulation Learning Computation (Step S4 of FIG. 7)

In the above-described simulation learning computation, the uncorrected response data is acquired by the characteristic measurement (Step S4). The model error Merr(n) is calculated using the uncorrected response data (Step S83), and when the acquisition of the response data S(n) is omitted, the model error Merr(n) is taken as 0.

By omitting the characteristic measurement in the simulation learning computation, although accuracy of temporary correction data is slightly decreased, the number of times of actually operating the control object may be reduced by one time.

(2) Method of Calculating the Unit Pulse Response Data U(n) (Step S81)

In the above-described embodiment, a step-like temporal change is used as a characteristic-measuring command value, and step response data acquired according to the command value is used to calculate response data for a unit pulse command value.

Embodiments are not limited thereto, and a pulse-like temporal change may be used as a characteristic-measuring command value, and unit pulse response data may be directly measured based on the command value.

Alternatively, a ramp-like temporal change may be used as a characteristic-measuring command value, and unit pulse response data may be calculated from ramp response data acquired according to the command value.

(3) Method of Calculating Unit Pulse Response Data U(n) (Step S81) and Method of Calculating Correction Data $Rev_{sim}(k_s)$ (Step S84)

In the above-described embodiment, the correction data $Rev_{sim}(k_s)(n)$ is calculated each time based on the unit pulse response data U(n) and the command value pattern D(n).

Instead of the unit pulse response data U(n), a transfer function summarizing the control computation unit 154 and the control object 10 may be used.

The transfer function may be determined by inputting white noise or the like and by a system identification method from response data to the white noise. That is, an arbitrary command value such as white noise may be assigned to the control computation unit 154, and a transfer function estimated by the system identification method based on a temporal change of a feedback value acquired corresponding to the arbitrary command value may be determined as a response characteristic.

The correction data $\text{Rev}_{sim}(k_s)(n)$ may be calculated each time based on the transfer function determined as above and the command value pattern D(n).

(4) Simulation Learning Computation in Offline System

In the above-described embodiment, as a typical example, a configuration in which the control device 100 executes learning computation and simulation learning computation has been described. However, the learning computation and the simulation learning computation may be executed by different processing subjects. For example, a feedback value obtained by the control device 100 outputting a command value is acquired, the simulation learning computation may be executed using the acquired feedback value in a personal computer separately prepared from the control device 100, and temporary correction data determined by executing the simulation learning computation may be returned to the control device 100.

K. Conclusion

In the control system including the learning control according to the present embodiment, a known command value is assigned to the control computation unit 154, and response data, which is a temporal change of a feedback value from the control object 10, is acquired. Then, based on the acquired response data, simulation learning computation in which a characteristic of a system including the control computation unit 154 and the control object 10 is reflected is executed, and temporary correction data for a command value pattern is determined. By employing the determined temporary correction data as an initial value of correction data for the learning computation, the learning computation may converge early, and appropriate correction data may be determined.

By employing the above-described simulation learning computation, the number of times the control object 10 is actually operated required to realize appropriate learning computation can be reduced, and therefore, time and effort for adjustment of the control system can be reduced. Highly accurate learning control can be realized with a smaller number of times of executing learning computation.

When a simulation execution environment has sufficient performance, because the number of times the control object 10 is actually operated can be reduced, the total time for realizing the learning computation can be shortened.

By executing a process of actually operating the control object 10 and the above-described simulation in parallel, the total time can be further shortened. Specifically, a method of executing a preliminary simulation for the next command value pattern while the control target 10 is actually being operated in the current command value pattern may be considered.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device for controlling a control object, the control device comprising:
a processor and a memory, configured to: generate a second command value obtained by compensating a first command value output at every control cycle according to a trajectory with a correction amount output at every control cycle according to correction data and calculate and output a control output for controlling a movement of the control object according to the second command value;
update the correction data based on a deviation between the first command value and a feedback value from the control object; and
determine an initial value of the correction data used in a state in which the update of the correction data is not executed, wherein the processor is further configured to:
acquire a response characteristic indicating a relationship between a command value assigned for the control object and a feedback value shown in the control object in response to the command value;
estimate a feedback value to be shown in the control object based on a value obtained by compensating the first command value with temporary correction data and the response characteristic; and
update the temporary correction data based on a deviation between the first command value and the estimated feedback value, wherein the processor is further configured to:
execute a simulation learning computation by using uncorrected response data and characteristic-measuring response data corresponding to a temporal change of a feedback value generated in response to a pre-correction command value defined in a characteristic-measuring command value pattern being assigned for the control object; and
set the temporary correction data obtained by executing the simulation learning computation as the initial value of the correction data.

2. The control device according to claim 1, wherein the processor is further configured to calculate a model error from a deviation between a feedback value shown in the control object in response to the output of the first command value and a corresponding estimated feedback value.

3. The control device according to claim 2, wherein the processor reflects the model error in post-update temporary correction data.

4. The control device according to claim 2, wherein the processor updates a current temporary correction data with a value obtained by multiplying a deviation from the estimated feedback value by a predetermined coefficient.

5. The control device according to claim 1, wherein the processor:
outputs a third command value at every control cycle according to a step-like designated value pattern; and
calculates a response characteristic for a unit pulse by temporal difference approximation for a temporal change in a feedback value acquired corresponding to the third command value.

6. The control device according to claim 1, wherein the processor assigns an arbitrary command value for the control object and determines a transfer function estimated by a system identification method based on a temporal change in a feedback value acquired corresponding to the arbitrary command value as a response characteristic.

7. The control device according to claim 1, wherein the processor is further configured to repeat processing of the estimating and the updating until a predetermined end condition is satisfied.

8. A non-transitory recording medium storing a control program for realizing a control device for controlling a control object, the control program executing, in a computer:
a step of generating a second command value obtained by compensating a first command value output at every control cycle according to a trajectory with a correction amount output at every control cycle according to correction data and calculating and outputting a control output for controlling a movement of the control object according to the second command value;
a step of updating the correction data based on a deviation between the first command value and a feedback value from the control object; and
a step of determining an initial value of the correction data used in a state in which the update of the correction data is not executed,
wherein the step of determining the initial value of the correction data comprises:
acquiring a response characteristic indicating a relationship between a command value assigned for the control object and a feedback value shown in the control object in response to the command value;
estimating a feedback value to be shown in the control object based on a value obtained by compensating the first command value with temporary correction data and the response characteristic; and
updating the temporary correction data based on a deviation between the first command value and the estimated feedback value, wherein the step of determining the initial value of the correction data further comprises:
executing a simulation learning computation by using uncorrected response data and characteristic-measuring response data corresponding to a temporal change of a feedback value generated in response to a pre-correction command value defined in a characteristic-measuring command value pattern being assigned for the control object; and
setting the temporary correction data obtained by executing the simulation learning computation as the initial value of the correction data.

9. A control system for controlling a control object, the control system comprising:
One or more processors and a memory, configured to:
generate a second command value obtained by compensating a first command value output at every control cycle according to a trajectory with a correction amount output at every control cycle according to correction data; calculate and output a control output for controlling a movement of the control object according to the second command value;
update the correction data based on a deviation between the first command value and a feedback value from the control object; and
determine an initial value of the correction data used in a state in which the update of the correction data is not executed, wherein the one or more processors are further configured to:

acquire a response characteristic indicating a relationship between a command value assigned for the control object and a feedback value shown in the control object in response to the command value;
estimate a feedback value to be shown in the control object based on a value obtained by compensating the first command value with temporary correction data and the response characteristic; and
update the temporary correction data based on a deviation between the first command value and the estimated feedback value, wherein the one or more processors are further configured to:
execute a simulation learning computation by using uncorrected response data and characteristic-measuring response data corresponding to a temporal change of a feedback value generated in response to a pre-correction command value defined in a characteristic-measuring command value pattern being assigned for the control object; and
set the temporary correction data obtained by executing the simulation learning computation as the initial value of the correction data.

10. The control device according to claim 3, wherein the processor updates a current temporary correction data with a value obtained by multiplying a deviation from the estimated feedback value by a predetermined coefficient.

11. The control device according to claim 2, wherein the processor:
outputs a third command value output at every control cycle according to a step-like designated value pattern; and
calculates a response characteristic for a unit pulse by temporal difference approximation for a temporal change in a feedback value acquired corresponding to the third command value.

12. The control device according to claim 3, wherein the processor:
outputs a third command value output at every control cycle according to a step-like designated value pattern; and
calculates a response characteristic for a unit pulse by temporal difference approximation for a temporal change in a feedback value acquired corresponding to the third command value.

13. The control device according to claim 4, wherein the processor:
outputs a third command value output at every control cycle according to a step-like designated value pattern; and
calculates a response characteristic for a unit pulse by temporal difference approximation for a temporal change in a feedback value acquired corresponding to the third command value.

14. The control device according to claim 2, wherein the processor assigns an arbitrary command value for the control object and determines a transfer function estimated by a system identification method based on a temporal change in a feedback value acquired corresponding to the arbitrary command value as a response characteristic.

15. The control device according to claim 3, wherein the processor assigns an arbitrary command value for the control object and determines a transfer function estimated by a system identification method based on a temporal change in a feedback value acquired corresponding to the arbitrary command value as a response characteristic.

16. The control device according to claim 4, wherein the processor assigns an arbitrary command value for the control object and determines a transfer function estimated by a system identification method based on a temporal change in a feedback value acquired corresponding to the arbitrary command value as a response characteristic.

17. The control device according to claim 2, wherein the processor is further configured to repeat processing of the estimating and the updating until a predetermined end condition s satisfied.

18. The control device according to claim 3, wherein the processor is further configured to repeat processing of the estimating and the updating until a predetermined end condition is satisfied.

19. The control device according to claim 4, wherein the processor is further configured to repeat processing of the estimating and the updating until a predetermined end condition is satisfied.

20. The control device according to claim 5, wherein the processor is further configured to repeat processing of the estimating and the updating until a predetermined end condition is satisfied.

\* \* \* \* \*